(12) United States Patent
Uchino et al.

(10) Patent No.: US 10,263,733 B2
(45) Date of Patent: Apr. 16, 2019

(54) USER APPARATUS AND TRANSMITTAL ACKNOWLEDGEMENT INFORMATION TRANSMISSION METHOD

(71) Applicant: NTT DOCOMO, INC., Tokyo (JP)

(72) Inventors: Tooru Uchino, Tokyo (JP); Kunihiko Teshima, Tokyo (JP); Kazuki Takeda, Tokyo (JP); Hideaki Takahashi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/520,897

(22) PCT Filed: Feb. 17, 2016

(86) PCT No.: PCT/JP2016/054532
§ 371 (c)(1),
(2) Date: Apr. 21, 2017

(87) PCT Pub. No.: WO2016/133106
PCT Pub. Date: Aug. 25, 2016

(65) Prior Publication Data
US 2018/0034597 A1 Feb. 1, 2018

(30) Foreign Application Priority Data
Feb. 20, 2015 (JP) .................................. 2015-032340

(51) Int. Cl.
*H04B 1/00* (2006.01)
*H04L 1/18* (2006.01)
(Continued)

(52) U.S. Cl.
CPC .......... *H04L 1/1829* (2013.01); *H04L 1/1854* (2013.01); *H04L 1/1861* (2013.01);
(Continued)

(58) Field of Classification Search
CPC ... H04L 5/0055; H04L 1/1861; H04L 1/1854; H04L 1/1829; H04W 72/04; H04W 16/32; H04W 28/04; H04W 28/06
See application file for complete search history.

(56) References Cited

U.S. PATENT DOCUMENTS

2013/0301503 A1 11/2013 Park
2014/0200011 A1 7/2014 Moilanen et al.
(Continued)

FOREIGN PATENT DOCUMENTS

| WO | 2014/020822 A1 | 2/2014 |
| WO | 2014/020851 A1 | 2/2014 |
| WO | 2014/038863 A1 | 3/2014 |

OTHER PUBLICATIONS

International Search Report issued in PCT/JP2016/054532 dated Mar. 29, 2016 (5 pages).
(Continued)

*Primary Examiner* — Nhan T Le
(74) *Attorney, Agent, or Firm* — Osha Liang LLP

(57) ABSTRACT

A user apparatus configured to communicate with a base station in a mobile communication system that supports carrier aggregation formed by a plurality of cells including a first cell and a second cell that uses a Transmission Time Interval (TTI) length different from a TTI length of the first cell, including a reception unit configured to receive downlink data transmitted from the base station in the second cell, and generate transmittal acknowledgement information for the downlink data; and a transmission unit configured to bundle a plurality of pieces of transmittal acknowledgement information, generated in the reception unit, for a plurality of pieces of downlink data into one piece of transmittal acknowledgement information to transmit the bundled transmittal acknowledgement information to the base station in the first cell.

6 Claims, 16 Drawing Sheets

(51) Int. Cl.
    *H04W 16/32*    (2009.01)
    *H04W 28/04*    (2009.01)
    *H04W 28/06*    (2009.01)
    *H04W 72/04*    (2009.01)
    *H04L 5/00*     (2006.01)

(52) U.S. Cl.
    CPC .......... *H04L 5/0055* (2013.01); *H04W 16/32* (2013.01); *H04W 28/04* (2013.01); *H04W 28/06* (2013.01); *H04W 72/04* (2013.01)

(56) References Cited

U.S. PATENT DOCUMENTS

| | | | |
|---|---|---|---|
| 2014/0204897 A1 | 7/2014 | Takeda et al. | |
| 2015/0173063 A1 | 6/2015 | Oizumi et al. | |
| 2015/0373676 A1* | 12/2015 | Lee | H04L 5/001 370/280 |
| 2016/0226631 A1* | 8/2016 | Seo | H04L 1/1854 |

OTHER PUBLICATIONS

Written Opinion of the International Searching Authority issued in PCT/JP2016/054532 dated Mar. 29, 2016 (7 pages).
Motorola; "E-TFC selection specification"; 3GPP TSG RAN WG2 #46bis, Tdoc R2-050819; Beijing, China; Apr. 4-8, 2005 (8 pages).
Ericsson; "HARQ RTT Timer"; 3GPP TSG-RAN WG2 #63bis, Tdoc R2-085657; Prague, Czech Republic; Sep. 29-Oct. 3, 2008 (3 pages).
3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).
3GPP TS 36.321 V12.4.0; "3rd Generation Partnership Project; Technical Specification Group Radio Access Network; Evolved Universal Terrestrial Radio Access (E-UTRA); Medium Access Control (MAC) protocol specification (Release 12)"; Dec. 2014 (60 pages).
3GPP TS 36.213 V12.4.0; "3rd Generation Partnership Project; Technical Specification Group Radio Access Network; Evolved Universal Terrestrial Radio Access (E-UTRA); Physical layer procedures (Release 12)"; Dec. 2014 (225 pages).
3GPP TS 36.211 V12.4.0; "3rd Generation Partnership Project; Technical Specification Group Radio Access Network; Evolved Universal Terrestrial Radio Access (E-UTRA); Physical channel and modulation (Release 12)"; Dec. 2014 (124 pages).
Extended European Search Report issued in corresponding European Patent Application No. 16752492.5, dated Feb. 2, 2018 (10 pages).

* cited by examiner

TDD A/N bundling

FIG.9

| | |
|---|---|
| ACK/NACK OF PCell | RESOURCE 1 |
| BUNDLED ACK/NACK (BUNDLE GROUP A) | RESOURCE 2 |
| BUNDLED ACK/NACK (BUNDLE GROUP B) | RESOURCE 3 |
| BUNDLED ACK/NACK (BUNDLE GROUP C) | RESOURCE 4 |

USER APPARATUS AND TRANSMITTAL ACKNOWLEDGEMENT INFORMATION TRANSMISSION METHOD

TECHNICAL FIELD

The present invention relates to an ACK/NACK transmission method for downlink data of a user apparatus in a mobile communication system such as LTE.

BACKGROUND ART

In the LTE system, carrier aggregation (CA: Carrier Aggregation) for performing communication by simultaneously using a plurality of carriers is adopted, in which predetermined bandwidths are used as basic units (non-patent document 1). In carrier aggregation, a carrier which is a basic unit is called a component carrier (CC: component carrier).

When CA is performed, a PCell (Primary cell) that is a reliable cell for ensuring connectivity and an SCell (Secondary cell) that is an appendant cell are set for the user apparatus UE. The user apparatus UE connects to a PCell first, and then, an SCell can be added as necessary. The PCell is a cell similar to an independent cell for supporting RLM (Radio Link Monitoring) and SPS (Semi-Persistent Scheduling) and the like.

Addition and deletion of the SCell is performed by RRC (Radio Resource Control) signaling. Since an SCell is in a deactivated state right after it is set in the user apparatus UE, communication becomes available (scheduling becomes available) only by activating it.

In the user apparatus UE and a base station in the LTE system, HARQ (Hybrid ARQ) control is performed in an HARQ entity of a MAC (Media Access Control) layer (non-patent document 2). For example, in HARQ control for downlink data in the user apparatus UE, when decoding of downlink data (TB: transport block) succeeds, an ACK is returned to the base station eNB, and when decoding is failed, a NACK is returned to the base station eNB. An ACK/NACK (HARQ acknowledgements, transmittal acknowledgement information) is transmitted at a predetermined timing after downlink data reception (example: after 4 subframes) by a PUCCH (Physical Uplink Control Channel) set in a predetermined UL resource (non-patent document 3).

RELATED ART DOCUMENT

Non Patent Document

[NON PATENT DOCUMENT 1] 3GPP TS 36.300 V12.4.0 (December 2014)
[NON PATENT DOCUMENT 2] 3GPP TS 36.321 V12.4.0 (December 2014)
[NON PATENT DOCUMENT 3] 3GPP TS 36.213 V12.4.0 (December 2014)
[NON PATENT DOCUMENT 4] 3GPP TS 36.211 V12.4.0 (December 2014)

SUMMARY OF THE INVENTION

Problem to be Solved by the Invention

In the existing LTE, it is defined that, as a structure of a radio frame, 1 radio frame is 10 ms, 1 subframe is 1 ms, and 1 slot is 0.5 ms (non-patent document 4). 1 subframe corresponds to a TTI (Transmission Time Interval) that is the smallest unit of scheduling. That is, a resource block (RB) is assigned to a user apparatus UE selected by scheduling of the base station eNB in each subframe. 1 RB is, for example, formed by 12 subcarriers (subcarriers of OFDM) in the frequency direction and 7 symbols (symbols of OFDM) in the time direction.

In 3GPP (3rd Generation Partnership Project), standardization of fifth generation radio technique (to be referred to as "5G" hereinafter) is scheduled to start after Release 14 (Rel-14). In 5G, in order to reduce delay of radio communications, it is being studied to shorten 1TTI to 0.1 ms, for example.

Further, as an operation form of 5G, an operation form is being studied in which CA is performed by overlaying a cell of 5G on a cell of LTE. An example of this operation form is shown in FIG. 1. As shown in FIG. 1, an LTE cell is formed as a macro cell by the base station eNB, and, for example, a 5G cell as a small cell is formed by an RRE (remote radio equipment) extending from the base station eNB, so that the user apparatus UE performs communication of high throughput by CA by the LTE cell and the 5G cell.

In the existing LTE, it is defined that, in CA in which serving cells of more than one cell are set, an ACK/NACK for DL is fed back only in a PCell (non-patent document 3). More specifically, the user apparatus UE feeds back an ACK/NACK for DL in each serving cell forming the CA by using a PUCCH resource in a PCell. Accordingly, DL CA becomes possible.

It is assumed that the above-mentioned control is used also in CA in which an LTE cell and a 5G cell are set.

Generally, UL CA implementation in the user apparatus UE is difficult due to IM (Inter-Modulation) and the like, and, it is considered that implementation of UL CA is similarly difficult when 5G is introduced. Thus, it is assumed to support DL CA in which a 5G cell is used as an SCell formed by a downlink CC in order to avoid delay of release of 5G terminals. FIG. 2 shows an example of ACK/NACK feedback in LTE-5G CA based on such an assumption. As shown in FIG. 2, in the LTE-5G CA, the user apparatus UE receives downlink data by the SCell and the PCell, and transmits an ACK/NACK for the data to the base station eNB by a PUCCH of LTE (PCell).

In the above-mentioned LTE-5G CA, a case is considered in which TTI length of 5G is 1/10 of the TTI length of LTE as shown in FIG. 3. In this case, as shown in FIG. 3, it is necessary to feed back both ACK/NACKs of an ACK/NACK for DL (of 1LTE-TTI) of LTE and an ACK/NACK for DL (10 5G-TTIs) of 5G.

In the existing LTE, a plurality of PUCCH formats are defined for transmitting ACK/NACK (non-patent documents 3, 4). For realizing LTE-5G CA, an ACK/NACK transmission method that does not exist conventionally is required. Thus, it is considered to define a new PUCCH format for ACK/NACK. However, use cases of the new PUCCH format are limited, so that there is a problem in that complexity in UE/eNB may uselessly increase due to implementation of the new PUCCH format. A technique is required for properly transmitting, to the base station, transmittal acknowledgement information for downlink data in LTE-5G CA while avoiding such useless increase of complexity.

The present invention is contrived in view of the above-mentioned point, and an object is to provide a technique, in a mobile communication system supporting carrier aggregation formed by a plurality of cells of different TTI lengths, for enabling a user apparatus that performs the carrier aggregation to properly transmit transmittal acknowledgement information for downlink data to a base station.

Means for Solving the Problem

According to an embodiment of the present invention, there is provided a user apparatus configured to communicate with a base station in a mobile communication system that supports carrier aggregation formed by a plurality of cells including a first cell and a second cell that uses a TTI length different from a TTI length of the first cell, including:

a reception unit configured to receive downlink data transmitted from the base station in the second cell, and generate transmittal acknowledgement information for the downlink data; and a transmission unit configured to bundle a plurality of pieces of transmittal acknowledgement information, generated in the reception unit, for a plurality of pieces of downlink data into one piece of transmittal acknowledgement information to transmit the bundled transmittal acknowledgement information to the base station in the first cell.

According to an embodiment of the present invention, there is provided a user apparatus configured to communicate with a base station in a mobile communication system that supports carrier aggregation formed by a plurality of cells including a first cell and a second cell that uses a TTI length different from a TTI length of the first cell, including:

a reception unit configured to receive downlink data transmitted from the base station in the second cell and generate transmittal acknowledgement information for the downlink data; and a transmission unit configured to transmit the transmittal acknowledgement information generated in the reception unit to the base station in the first cell by using a resource in an uplink control channel in which resources for transmitting transmittal acknowledgement information for downlink data of a plurality of cells that form the carrier aggregation are predetermined.

According to an embodiment of the present invention, there is provided a transmittal acknowledgement information transmission method executed by a user apparatus configured to communicate with a base station in a mobile communication system that supports carrier aggregation formed by a plurality of cells including a first cell and a second cell that uses a TTI length different from a TTI length of the first cell, including:

a reception step of receiving downlink data transmitted from the base station in the second cell, and generating transmittal acknowledgement information for the downlink data; and a transmission step of bundling a plurality of pieces of transmittal acknowledgement information, generated in the reception step, for a plurality of pieces of downlink data into one piece of transmittal acknowledgement information to transmit the bundled transmittal acknowledgement information to the base station in the first cell.

According to an embodiment of the present invention, there is provided a transmittal acknowledgement information transmission method executed by a user apparatus configured to communicate with a base station in a mobile communication system that supports carrier aggregation formed by a plurality of cells including a first cell and a second cell that uses a TTI length different from a TTI length of the first cell, including:

a reception step of receiving downlink data transmitted from the base station in the second cell and generating transmittal acknowledgement information for the downlink data; and a transmission step of transmitting the transmittal acknowledgement information generated in the reception step to the base station in the first cell by using a resource in an uplink control channel in which resources for transmitting transmittal acknowledgement information for downlink data of a plurality of cells that form the carrier aggregation are predetermined.

Effect of the Present Invention

According to an embodiment of the present invention, it becomes possible, in a mobile communication system supporting carrier aggregation formed by a plurality of cells of different TTI lengths, that a user apparatus that performs the carrier aggregation properly transmits transmittal acknowledgement information for downlink data to a base station.

BRIEF DESCRIPTION OF THE DRAWINGS

FIG. 9 is a diagram showing an example of a PUCCH resource in ACK/NACK bundling;

EMBODIMENTS FOR CARRYING OUT THE INVENTION

In the following, embodiments of the present invention are described with reference to figures. The embodiments described below are merely examples, and embodiments to which the present invention is applied are not limited to the embodiments below.

Figure 1:
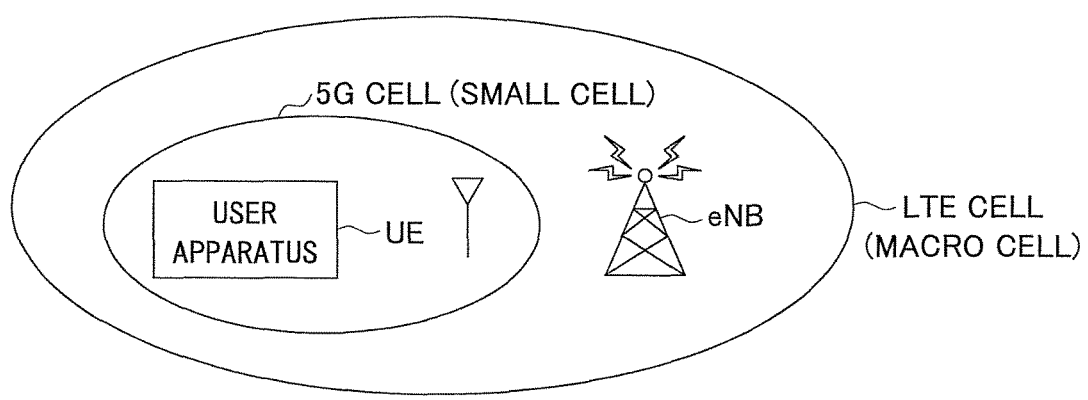
FIG. 1 is a diagram showing an example of a case where an LTE cell is used as a macro cell and a 5G cell is used as a small cell.

The present embodiment is intended for a mobile communication system that can perform carrier aggregation (CA) in which an LTE cell and a 5G cell are set, like one described using FIG. 1, for example. However, the present invention is not limited to LTE and 5 g, and can be applied to other RATs (radio access technologies) that can perform carrier aggregation.

Also, a "cell" that forms CA is a cell where the user apparatus UE resides, and it may be referred to as a serving cell. As an example, the "cell" that forms CA is formed by only a downlink CC or by a downlink CC and an uplink CC. Also, the release of 3GPP standard specifications of "LTE" in the present specification and the claims is an arbitrary release in which CA is introduced. However, it is not limited to this.

(System Whole Configuration)

Figure 4:
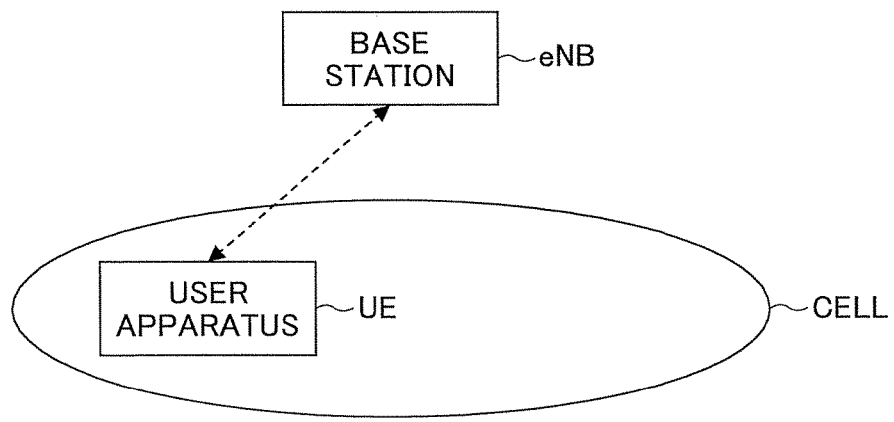
FIG. 4 is a block diagram of a system in an embodiment of the present invention.

FIG. 4 shows a block diagram of a communication system in an embodiment (common to first and second embodiments, and to modified example) of the present invention. As shown in FIG. 4, the communication system of the present embodiment is a mobile communication system including a base station eNB and a user apparatus UE. It is possible to perform communication of LTE-5G CA by the base station eNB and the user apparatus UE. FIG. 4 shows one base station eNB and one user apparatus UE. However, this is for the sake of convenience of drawing, and a plurality of ones may exist respectively.

In LTE-5G CA, the TTI length is 1 ms in the LTE cell, and TTI length is 0.1 ms in the 5G cell. By the way, the TTI length=0.1 ms of the 5G cell is merely an example, and the TTI length of the 5G cell may be another TTI length which is shorter than TTI of LTE. In the following, in order to clearly distinguish "subframe" between LTE and 5G, a subframe of LTE (=TTI length of LTE) is called "LTE subframe", and a subframe of 5G (=TTI length of 5G) is called "5G subframe". By the way, when it is not necessary to distinguish between LTE and 5G, or when it is clear which is referred to LTE or 5G, or the like, there is a case where "subframe" is used.

Figure 2:
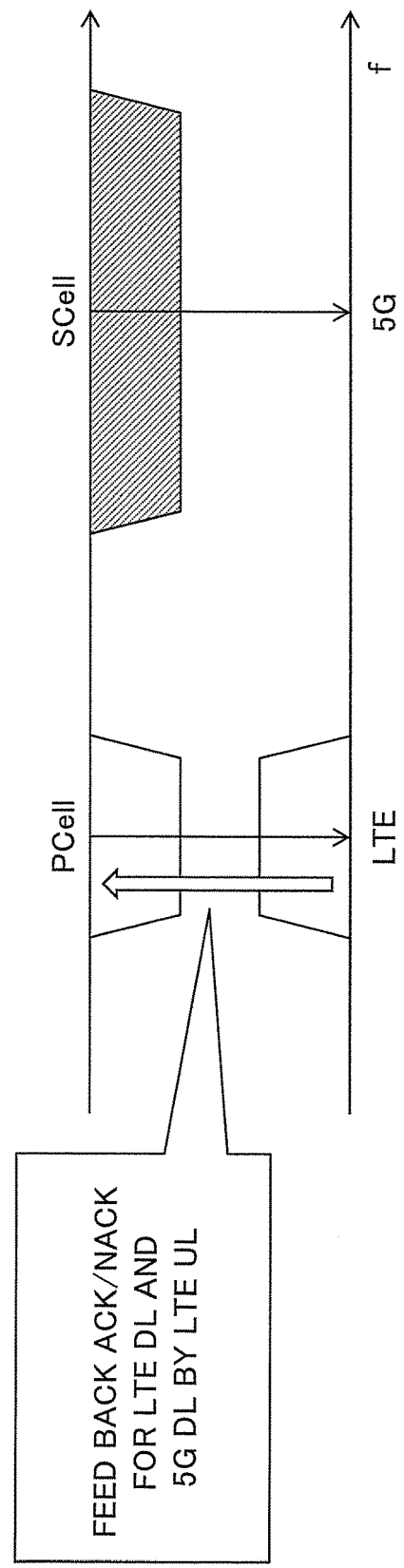
FIG. 2 is a diagram for explaining feedback of an ACK/NACK.
Figure 3:
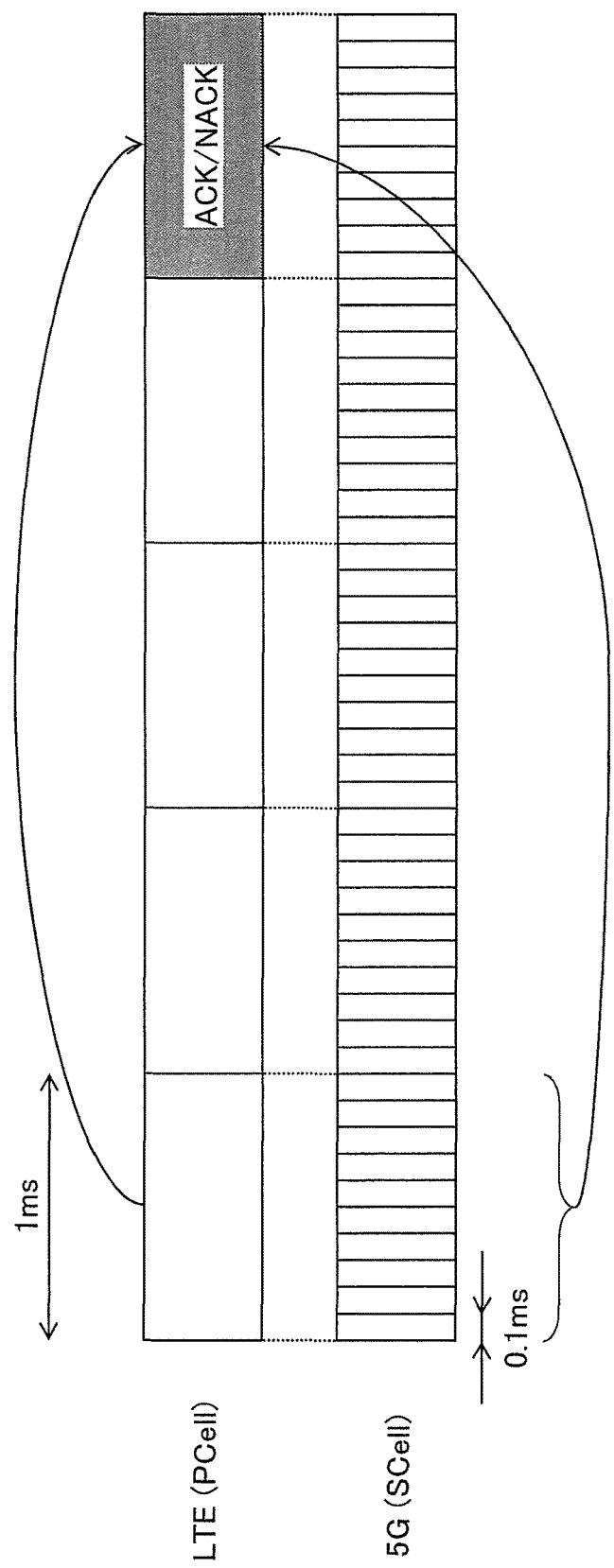
FIG. 3 is a diagram for explaining a problem.

Also, in the present embodiment, when LTE-5G CA is configured in the user apparatus UE, as shown in FIG. 2, a PCell is set by LTE, and an SCell is set by 5G, and an ACK/NACK for downlink data is transmitted to the base station eNB by a PUCCH of the PCell. By the way, in a case where an SCell in which a PUCCH can be transmitted is configured as a cell of LTE, an ACK/NACK may be transmitted by using the PUCCH of the SCell.

In the example of FIG. 4, although one cell is shown, this is also for the sake of convenience of drawing. When CA is set, there are a plurality of cells. Also, for example, a configuration may be adopted in which there is (are) provided one or a plurality of RREs (remote radio apparatus(es)) that is (are) connected to a base station eNB by an optical fiber and the like at a place separated from the base station eNB (example: configuration shown in FIG. 1). In the configuration using the RRE, for example, a macro cell is formed by the PCell, and a small cell is formed by an SCell under the RRE, so that a user apparatus UE residing in the small cell performs high throughput communication by CA.

Basic Operation Example

A basic operation example of the communication system in the present embodiment (common to first and second embodiments, and modified example) is described with reference to FIG. 5. As a premise of the operation shown in FIG. 5, it is assumed that CA that is formed by a PCell of LTE and an SCell of 5G is set between the base station eNB and the user apparatus UE.

Figure 5:
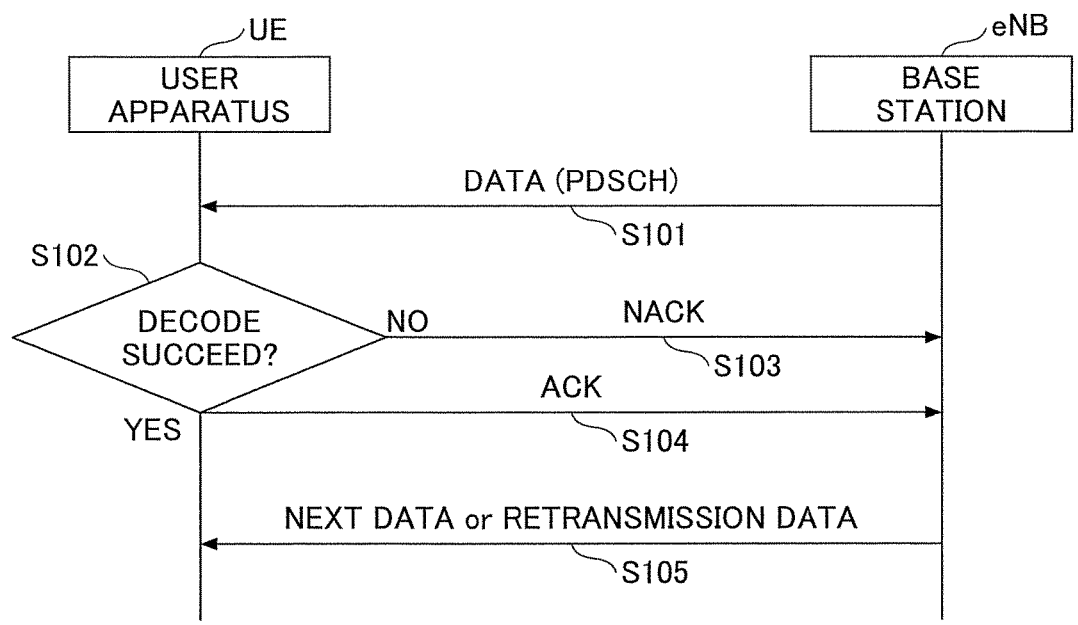
FIG. 5 is a diagram for explaining basic operation of the system.

In step 101 of FIG. 5, the user apparatus UE sequentially receives DL data (TB: data of transport block) by the SCell. Here, for example, in a period of 1 LTE subframe, the user apparatus UE receives DL data by a plurality of 5G subframes. Although the user apparatus UE receives (signal of) one TB or two TBs in one 5G subframe depending on transmission modes, it is assumed that the user apparatus UE receives one TB in one 5G subframe as an example unless otherwise stated.

In step 102, the user apparatus UE determines whether to succeed in decoding each piece of DL data. As a basic operation, when the user apparatus UE succeeds in decoding of DL data, the user apparatus UE generates an ACK of the DL data, and when the user apparatus UE fails in decoding of DL data, the user apparatus UE generates a NACK of the DL data. Then, the user apparatus UE transmits the ACK/NACK to the base station eNB by using a PUCCH of the PCell (steps 103 and 104).

When the base station eNB receives an ACK for transmitted DL data, the base station eNB transmits next DL data, and when the base station eNB receives a NACK for transmitted DL data, the base station eNB retransmits the DL data (step 105).

In the present embodiment, "succeed in decoding" is, for example, that there is no error in data obtained by decoding processing (including a case where errors are equal to or less than a predetermined number), and "fail in decoding" is, for example, that there is an error in data obtained by decoding processing (including a case where errors are equal to or greater than a predetermined number).

As described below in detail, in the first embodiment, transmission of ACK/NACKs for a plurality of pieces of DL data received by a plurality of 5G subframes is performed by utilizing ACK/NACK bundling. In the second embodiment, transmission of ACK/NACKs for a plurality of pieces of DL data received by a plurality of 5G subframes is performed by diverting a PUCCH format defined for CA of a plurality of CCs.

In the following, a first embodiment, a second embodiment and a modified example are described in detail.

First Embodiment

First, a first embodiment of the present invention is described. As already described, there is a possibility in that complexity of UE/eNB uselessly increases if a new PUCCH format is defined for ACK/NACK in order to realize LTE-5G CA in a conventional technique. In the present embodiment, for solving this problem, ACK/NACK bundling that is an existing mechanism is utilized for ACK/NACK transmission in LTE-5G CA. By the way, although ACK/NACK bundling itself is an existing mechanism, there is no existing technique for applying ACK/NACK bundling to LTE-5G CA. By using the ACK/NACK bundling, an existing PUCCH format can be used for ACK/NACK transmission in LTE-5G CA. Therefore, it is possible to decrease complexity without necessity of defining a new format.

Here, an outline of ACK/NACK bundling is described. A plurality of bits of ACK/NACKs are generated for each TTI (each subframe) for a plurality of pieces of data (code words) received by a plurality of subframes. In a case where ACK/NACK bundling is not performed, basically, one ACK/NACK is transmitted by one UL subframe. However, in TDD, for example, when the quantity of DL subframes is greater than the quantity of UL subframes, it is necessary to transmit a plurality of ACK/NACKs for data received in a plurality of DL subframes by using one UL subframe. For example, in such a case, ACK/NACK bundling is utilized. In ACK/NACK bundling, logical AND operation is performed on a plurality of ACK/NACK bits to obtain one bit, and the one bit is transmitted as an ACK/NACK by one subframe.

Figure 6:
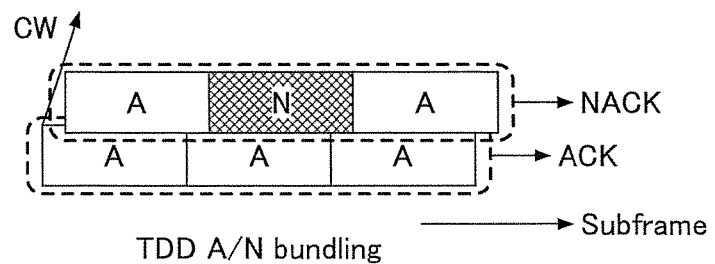
FIG. 6 is a diagram for explaining ACK/NACK bundling.

FIG. 6 shows, as an example, ACK/NACK bundling (described as A/N bundling in the figure) in TDD of Rel-8. As shown in FIG. 6, for example, by bundling three ACKs, one ACK is obtained, and by bundling ACK/NACK/ACK, one NACK is obtained.

In the present embodiment, ACK/NACKs of data received by each downlink subframe in the 5G cell are bundled, and transmitted by the LTE cell (PCell). By the way, an ACK/NACK for downlink data in the LTE cell can be transmitted in the same way as the conventional technique.

An example of operation in the first embodiment is described with reference to FIG. 7. As a premise of the operation shown in FIG. 7, it is assumed that CA that is formed by a PCell of LTE and an SCell of 5G is set in the base station eNB and the user apparatus UE.

Figure 7:
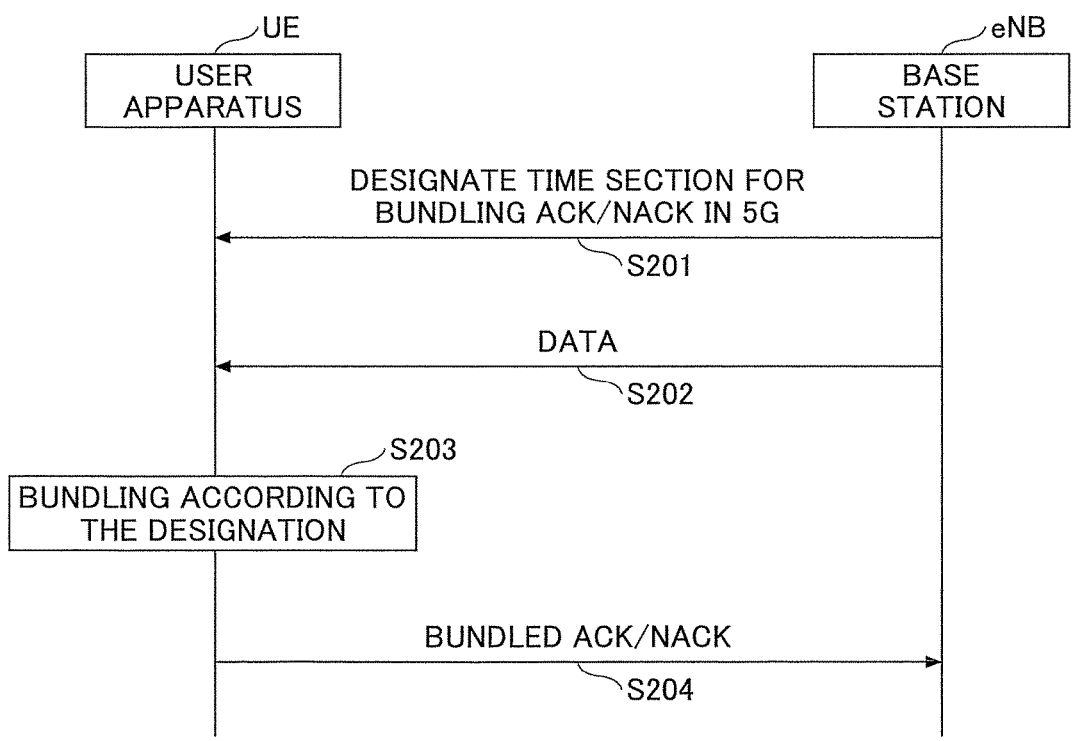
FIG. 7 is a diagram showing an example of a process sequence in a first embodiment.

First, as shown in FIG. 7, a time section for applying ACK/NACK bundling in 5G is designated from the base station eNB to the user apparatus UE (step 201). This designation is, for example, can be performed by using a number of the 5G subframe. As an example, in a case where there are 5G subframes 0~9 in a time section corresponding to one LTE subframe, designation information indicating "bundling 5G subframes 3~6" is transmitted to the user apparatus UE.

As for an ACK/NACK to be transmitted by an UL subframe of LTE, only one time section (group) of bundling may be designated for an SCell of 5G, or a plurality of time sections may be designated. For example, the base station eNB can transmit, to the user apparatus UE, designation information indicating ("bundling 5G subframes 0~2 as group A", "bundling 5G subframes 3~6 as group B", "bundling 5G subframes 7~9 as group C"). The group may be called a bundling group.

Transmission of the designation information may be performed by an RRC signal, or may be performed by a MAC signal or a PHY signal (PDCCH and the like). Also, for example, the bundling time section may be designated by an RRC signal (RRC connection reconfiguration) for configuring an SCell in the user apparatus UE. In the case where the bundling time section is designated by an RRC signal in this way, the time section of bundling is determined semi-statically.

Also, in the case where the MAC signal/the PHY signal is used, designation of the time section of bundling may be performed for each subframe of LTE. In the case where designation of the time section of bundling is performed for each subframe of LTE, the time section of bundling can be changed dynamically (for each LTE subframe).

The user apparatus UE sequentially receives DL data (TB) by the SCell (step 202). Here, for example, the user apparatus UE receives a plurality of pieces of DL data by a plurality of 5G subframes in a period of 1 LTE subframe.

The user apparatus UE generates ACK/NACKs of each piece of DL data received in step 202, and bundles ACK/NACKs of DL data according to bundling designation information received in step 201 (step 203).

In step 204, the user apparatus UE transmits a bundled ACK/NACK to the base station eNB by using a PUCCH of the PCell. Here, for example, according to the specification of LTE, the user apparatus UE transmits the bundled ACK/NACK to the base station eNB in an LTE subframe which is 4 LTE subframes after the LTE subframe in which the DL data is received.

Figure 8:
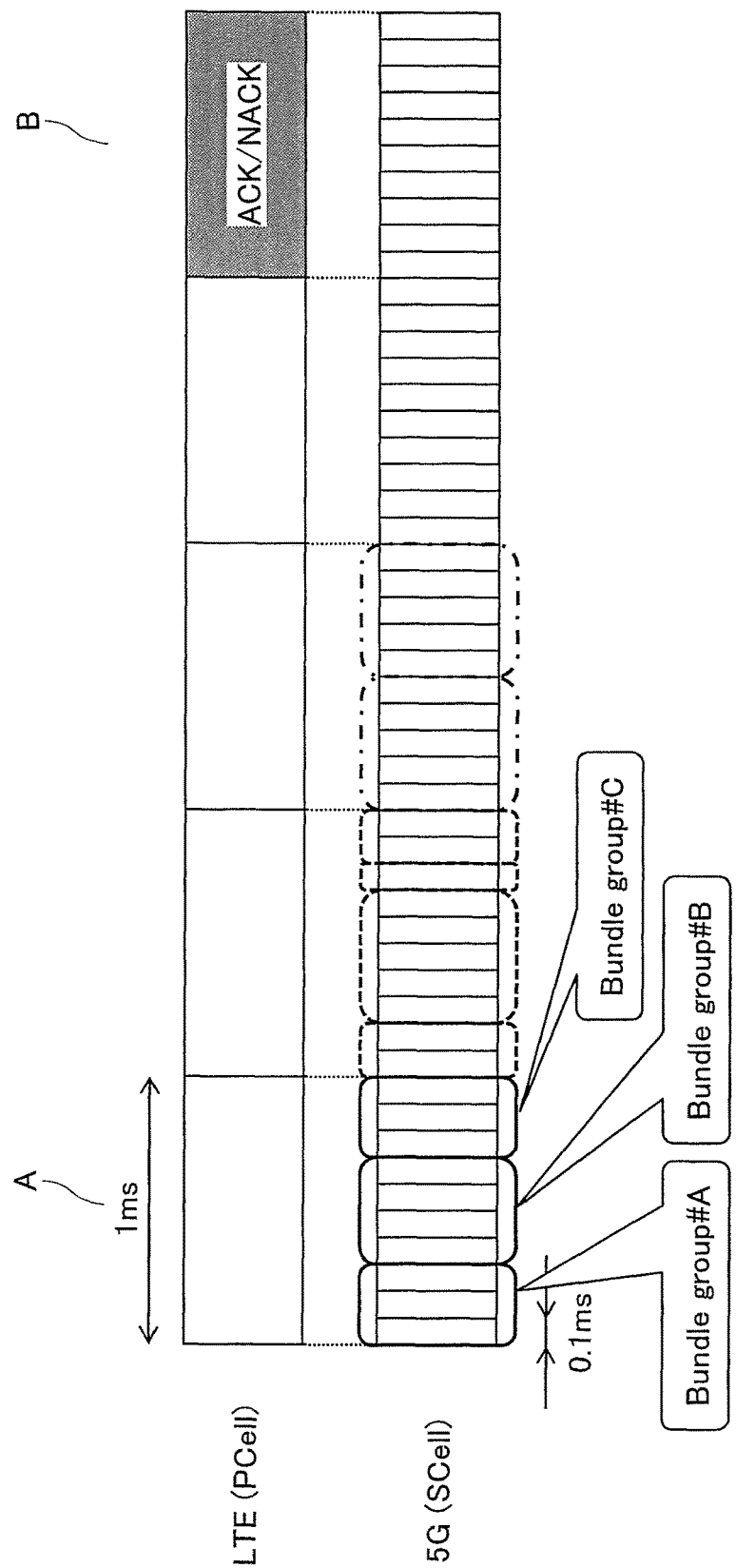
FIG. 8 is a diagram for explaining an example of bundling processing.

An example of bundling processing is described with reference to FIG. 8. In the example of FIG. 8, in an LTE subframe section indicated by "A", bundling time sections are set as shown in the figure in the SCell by a MAC signal, for example. That is, in the same way as the case described before, 5G subframes 0~2 are set as a bundling group A, 5G subframes 3~6 are set as a bundling group B, and 5G subframes 7~9 are set as a bundling group C. In the example shown in FIG. 8, a bundling group setting different from that of the first LTE subframe section is made in the next LTE subframe section and in the further next LTE subframe section.

The ACK/NACKs of each DL data received in the SCell in the LTE subframe section indicated by "A" are bundled for each bundle group, and they are transmitted to the base station eNB by a PUCCH of the PCell in an LTE subframe indicated by "B" which is 4 LTE subframes after "A". An arrangement example of ACK/NACKs for each bundle group in the radio resource of the PUCCH is shown in FIG. 9. In the example shown in FIG. 9, an ACK/NACK for DL data in the PCell is included. As shown in FIG. 9, for each ACK/NACK of each cell/group, transmission is performed by using a predetermined resource in the PUCCH. As the predetermined resource in the PUCCH, for example, a resource for each CC that is defined for existing CA can be used. The "resource" for ACK/NACK transmission is, for example, a combination of a time resource, a frequency resource and a code resource.

In the case of FIG. 9, for example, the base station eNB regards an ACK/NACK mapped to a resource for CC#1 as an ACK/NACK of the PCell, regards an ACK/NACK mapped to a resource for CC#2 as an ACK/NACK of the bundling group A, regards an ACK/NACK mapped to a resource for CC#3 as an ACK/NACK of the bundling group B, and regards an ACK/NACK mapped to a resource for CC#4 as an ACK/NACK of the bundling group C.

By using the technique described in the second embodiment, the base station eNB may transmit, to the user apparatus UE, association information between ACK/NACK resources for CCs and ACK/NACK resources for bundling groups, so that the user apparats UE may transmit a bundled ACK/NACK using an ACK/NACK resource according to the association information.

Second Embodiment

Next, a second embodiment is described. In the existing LTE, a PUCCH format for transmitting ACK/NACKs for 5 carriers (CC) at the maximum is defined. On the other hand, in Rel-13, it is assumed that, in CA, carriers equal to or greater than 6 CCs (up to 32 CCs) are aggregated. Thus, it is being studied to extend the PUCCH format in order to be able to transmit ACK/NACKs for data transmitted by such many CCs. By the way, this is an extension of an existing PUCCH format, and is different from introducing a new PUCCH format for transmitting ACK/NACKs for 5G data.

In the present embodiment, a PUCCH format that is extended from the existing PUCCH format and that can perform ACK/NACK transmission of CCs equal to or greater than 6 CCs is used. However, it is not essential to use the extended format, and depending on the TTI length of 5G, it is possible to use an existing PUCCH format that is not extended (a format that can transmit ACK/NACKs of 5 CCs).

Figure 10:
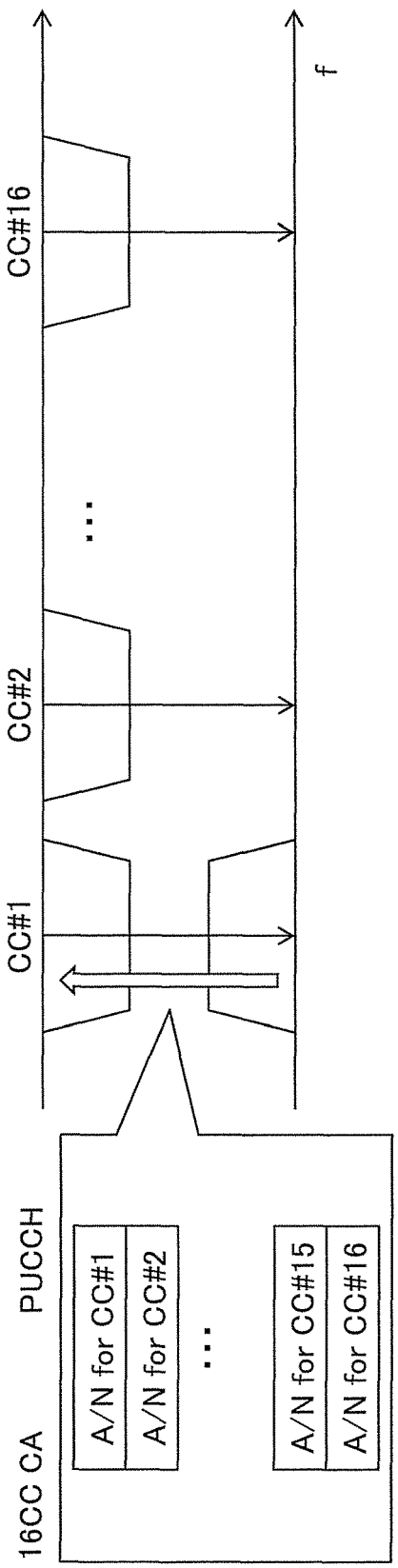
FIG. 10 is a diagram for explaining an example of ACK/NACK transmission in 16CC CA.

A usage example of the extended PUCCH format is described with reference to FIG. 10. FIG. 10 shows an example of 16 CC CA in which 16 CCs (CC may be referred to as a cell) are aggregated to execute CA. In FIG. 10, a cell formed by CC#1 is a PCell. As shown in FIG. 10, by a resource determined for each CC in the PUCCH, an ACK/NACK of the CC is transmitted. For example, the base station eNB designates, to the user apparatus UE, by an RRC signal and the like, type designation of the PUCCH format that can transmit ACK/NACKs up to 16 CCs, and resource amount (number of bits and the like) by which the user apparatus UE can transmit ACK/NACKs using the format.

An example of operation in the present embodiment is described with reference to FIG. 11. As a premise of the operation shown in FIG. 11, it is assumed that CA that is formed by a PCell of LTE and an SCell of 5G is set in the base station eNB and the user apparatus UE.

First, setting of a PUCCH format is performed from the base station eNB to the user apparatus UE by an RRC signal and the like (step 301). The PUCCH format that is set here is a PUCCH format (example: PUCCH of FIG. 10) that can transmit ACK/NACKs of many CCs such as 16 CCs or 32 CCs (16/32CC) and the like. Designation of a PUCCH format here may include designation of a resource amount for ACK/NACK transmission. In step 301, setting of 5G-SCell and setting of the PUCCH format may be performed simultaneously.

Next, the base station eNB associates an ACK/NACK resource for each CC in the PUCCH format set in step 301 with a 5G subframe number (5G-TTI number) for the user apparatus UE. For example, the base station eNB transmits, to the user apparatus UE, designation information for associating ACK/NACK resources for CCs with resources for ACK/NACKs of 5G, such as "ACK/NACK resource for CC#1 in 16/32CC"="ACK/NACK resource for 5G subframe #1 in 5G SCell".

The instruction of the association may be performed by an RRC signal, or may be performed by a MAC signal or a PHY signal. In a case where the RRC signal is used, the association may be instructed at the same time when setting the PUCCH format in step 301. Also, in the case where the MAC signal or the PHY signal is used, association between the ACK/NACK resources for CCs and ACK/NACK resources for 5G subframes may be changed for each LTE subframe.

Figure 12:
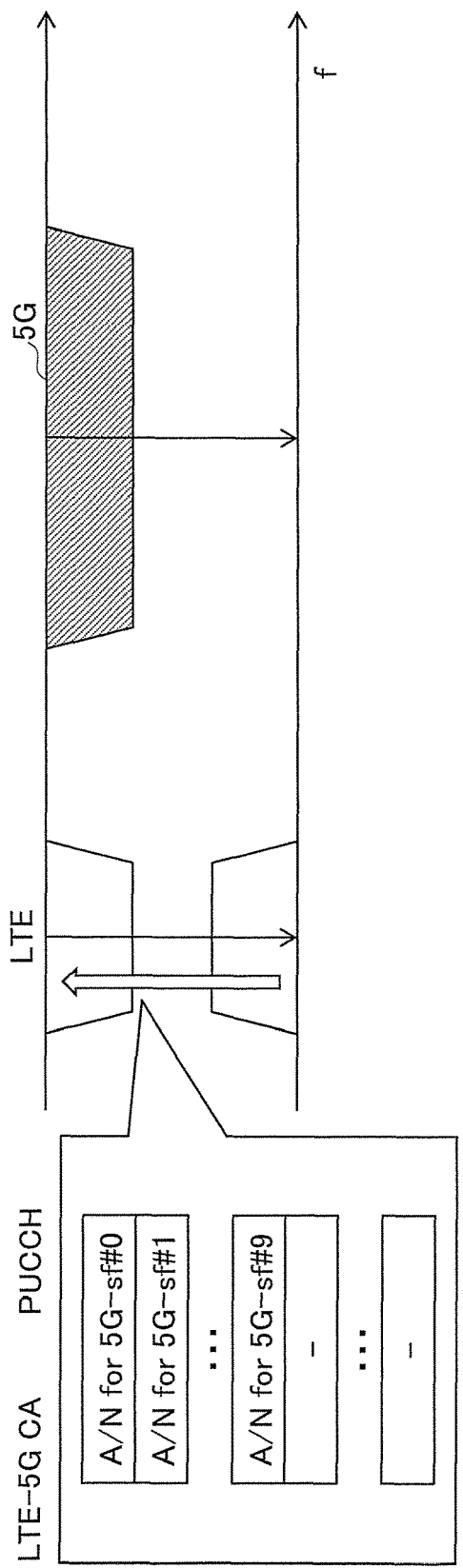
FIG. 12 is a diagram showing an example of ACK/NACK transmission for data reception in 5G.

FIG. 12 shows an example of association, FIG. 12 shows a case where the PUCCH format shown in FIG. 10 is used. In the case of FIG. 12, an ACK/NACK resource for each CC is associated with an ACK/NACK resource for each 5G subframe, in which, an ACK/NACK resource for CC#1 is associated with an ACK/NACK resource for 5G subframe #0, and an ACK/NACK resource for CC#2 is associated with an ACK/NACK resource for 5G subframe #1, and the like.

Figure 11:
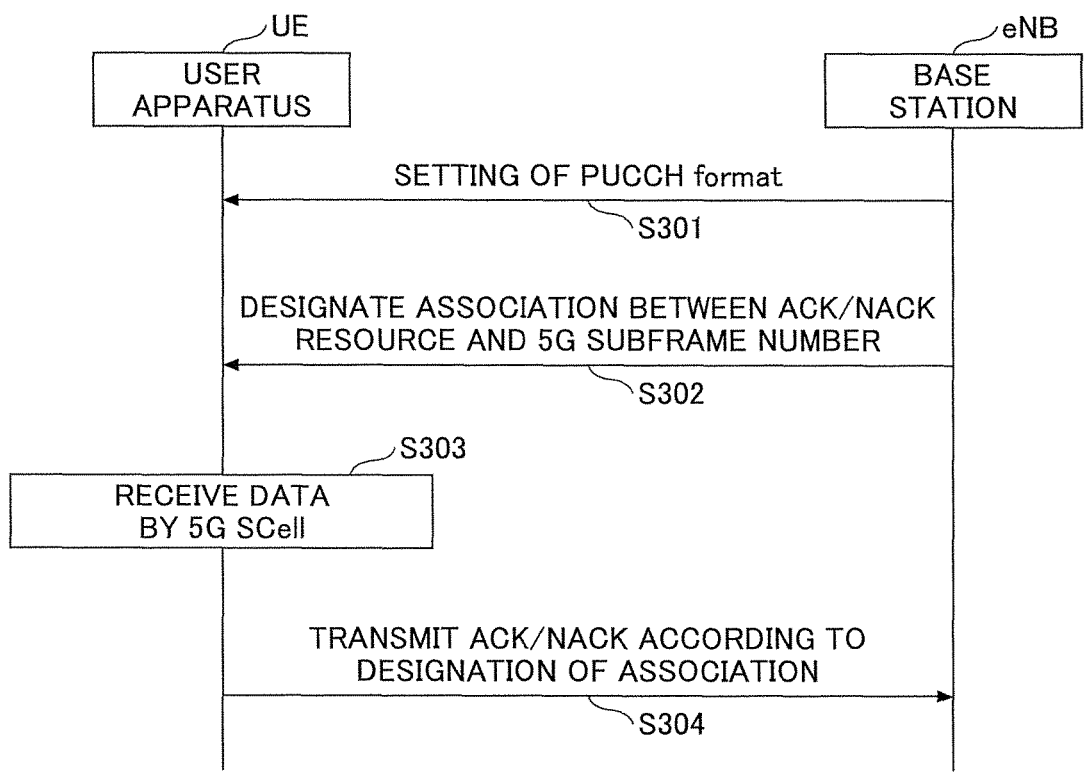
FIG. 11 is a diagram showing an example of a process sequence in a second embodiment.

In step 303 of FIG. 11, the user apparatus UE receives DL data (TB) from the base station eNB by the SCell to generate ACK/NACKs for the DL data.

In step 304, the user apparatus UE transmits, to the base station eNB, ACK/NACKs for the DL data received in the SCell using ACK/NACK resources of the PUCCH in accordance with designation information of association received in step 302. The transmission of the ACK/NACKs is performed, for example, by a PUCCH in an LTE subframe which is 4 LTE subframes after the LTE subframe including 5G subframes in which the DL data is received. This is similar to the case ("B" for "A") of FIG. 8.

For example, in the example shown in FIG. 12, in a case where the user apparatus UE receives DL data of the SCell in each of 5G subframe #1 and 5G subframe #2, the user apparatus UE transmits ACK/NACKs of the DL data using ACK/NACK resources of CC#2 and CC#3 of the PUCCH.

The first embodiment and the second embodiment can be executed by combining them. That is, it is possible to transmit a bundled ACK/NACK by using an ACK/NACK resource for CC of the PUCCH described in the second embodiment.

Modified Example

Next, a processing example that can be applied to and combined with any of the first embodiment and the second embodiment is described as a modified example.

When realizing LTE-5G CA, it is assumed that HARQ timing follows HARQ RTT of a PCell in which an ACK/NACK is transmitted. Thus, as described so far, in the present embodiment, an ACK/NACK is transmitted in an LTE subframe 4 ms after an LTE subframe in which DL data is received. However, in this case, there is a problem in that delay reduction effect based on reduction of TTI in 5G cannot be obtained.

An HARQ RTT indicates a time from when the user apparatus UE receives DL data and transmits an ACK/NACK until when the user apparatus UE receives next data. By the way, in the non-patent document 2, "HARQ RTT Timer" is defined as "This parameter specifies the minimum amount of subframe(s) before a DL HARQ retransmission is expected by the MAC entity". When the user apparatus UE fails in decoding DL data, the user apparatus UE starts the HARQ RTT Timer. The user apparatus UE does not monitor a PDCCH of retransmission data before the HARQ RTT Timer expires. When the HARQ RTT Timer expires, the user apparatus monitors a PDCCH. Accordingly, power saving can be realized.

In the example described so far, it takes 4 ms until the user apparatus UE transmits an ACK/NACK after the user apparatus UE receives DL data. In other words, it takes 4 ms until the base station eNB obtains an ACK/NACK after the base station eNB transmits DL data (PDCCH, PDSCH). Also, it takes 4 ms until the base station eNB transmits next data (new data or retransmission data) after the base station eNB receives an ACK/NACK. In other words, it takes 4 ms until the user apparatus UE receives next data after the user apparatus UE transmits an ACK/NACK. That is, in this example, HARQ RTT is 8 ms.

As mentioned above, if this goes on, delay reduction effect by reduction of TTI in 5G cannot be obtained. Thus, in the modified example, an HARQ RTT is designated for each cell (or for each cell group which is a group of a plurality of cells) from the base station eNB to the user apparatus UE. The amount to designate may be RTT or may be a time from when the user apparatus UE receives DL data until when the user apparatus UE transmits an ACK/NACK. Also, the value of "HARQ RTT Timer" may be notified of as a value of the HARQ RTT. Also, both of the value of "HARQ RTT Timer" and the value of HARQ RTT may be notified.

In the modified example, the HARQ RTT designated to the 5G cell is a value smaller than an HARQ RTT (example: 8 ms) in the existing LTE. Also, in the modified example, the HARQ RTT designated for the LTE cell may be a value smaller than an HARQ RTT (example: 8 ms) in the existing LTE. The user apparatus UE transmits an ACK/NACK predetermined time after receiving DL data based on the small HARQ RTT. When the HARQ RTT is shorter than the HARQ RTT of the existing LTE, the predetermined time becomes shorter than a time (4 ms) in the existing LTE. Accordingly, it becomes possible to realize low delay by a short TTI for 5G in the 5G cell.

An example of operation in the modified example is described with reference to FIG. 13. As a premise of the operation shown in FIG. 13, it is assumed that CA that is formed by a PCell of LTE and an SCell of 5G is set in the base station eNB and the user apparatus UE.

First, designation of an HARQ RTT of each cell is performed from the base station eNB to the user apparatus UE (step 401). The designation of the HARQ RTT of each cell may be performed by an RRC signal or may be performed by a MAC signal or a PHY signal. When using the RRC signal, a UE specific signal may be used, or a broadcast signal (system information) may be used. In step 401, setting of the 5G-SCell and designation of the HARQ RTT of each cell may be performed simultaneously by using an RRC signal.

Designation of the HARQ RTT may be performed in units of LTE subframe, or may be performed in units of 5G subframe. Also, the explicit designation of an HARQ RTT in step 401 may not be performed. In this case, designation of the HARQ RTT is implicitly performed, so that, for example, a predetermined RTT is used in the user apparatus UE and the base station eNB. The predetermined RTT is, for example, a value (example: 8 ms) used in the existing LTE for DL data in the LTE cell, and is a default value (example: a value shorter than 8 ms) defined for 5G for DL data in the 5G cell.

Figure 13:
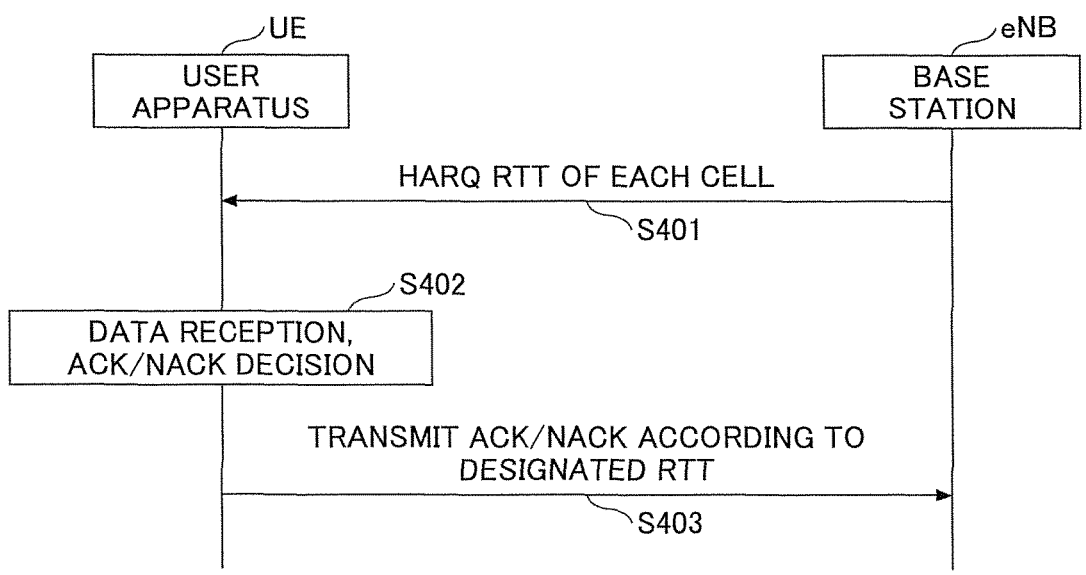
FIG. 13 is a diagram showing an example of a process sequence in a modified example.

In step 402 of FIG. 13, the user apparatus UE receives DL data of each cell, generates ACK/NACKs for each piece of DL data, and transmits ACK/NACKs by a PUCCH of the PCell after a predetermined time elapses from when receiving DL data according to the HARQ RTT of each cell designated in step 401 (step 403). As a transmission method of an ACK/NACK, a method in the first embodiment may be used, or a method in the second embodiment may be used.

For example, in a case where it is known that it takes Xms until the base station eNB transmits next data after the base station eNB receives an ACK/NACK, if the designated HARQ RTT is Yms, the user apparatus UE transmits an ACK/NACK in an LTE subframe (Y−X)ms after an LTE subframe that corresponds to a time when receiving DL data. Also, in a case where the time designated from the base station eNB is directly a time from when receiving DL data until when transmitting an ACK/NACK instead of the RTT, the user apparatus UE transmits an ACK/NACK according to the time.

By the way, since it depends on UE implementation to what extent HARQ RTT can be shortened, capability information (capability) indicating to what extent the UE supports short RTT may be notified from the user apparatus UE to the base station eNB. The notification is, for example, performed before step 401 of FIG. 13. The base station eNB notifies the user apparatus UE of an HARQ RTT that falls within the capability, in step 401, based on the capability information (example: the smallest value of RTT that the UE can set) obtained from the notification.

Figure 14:
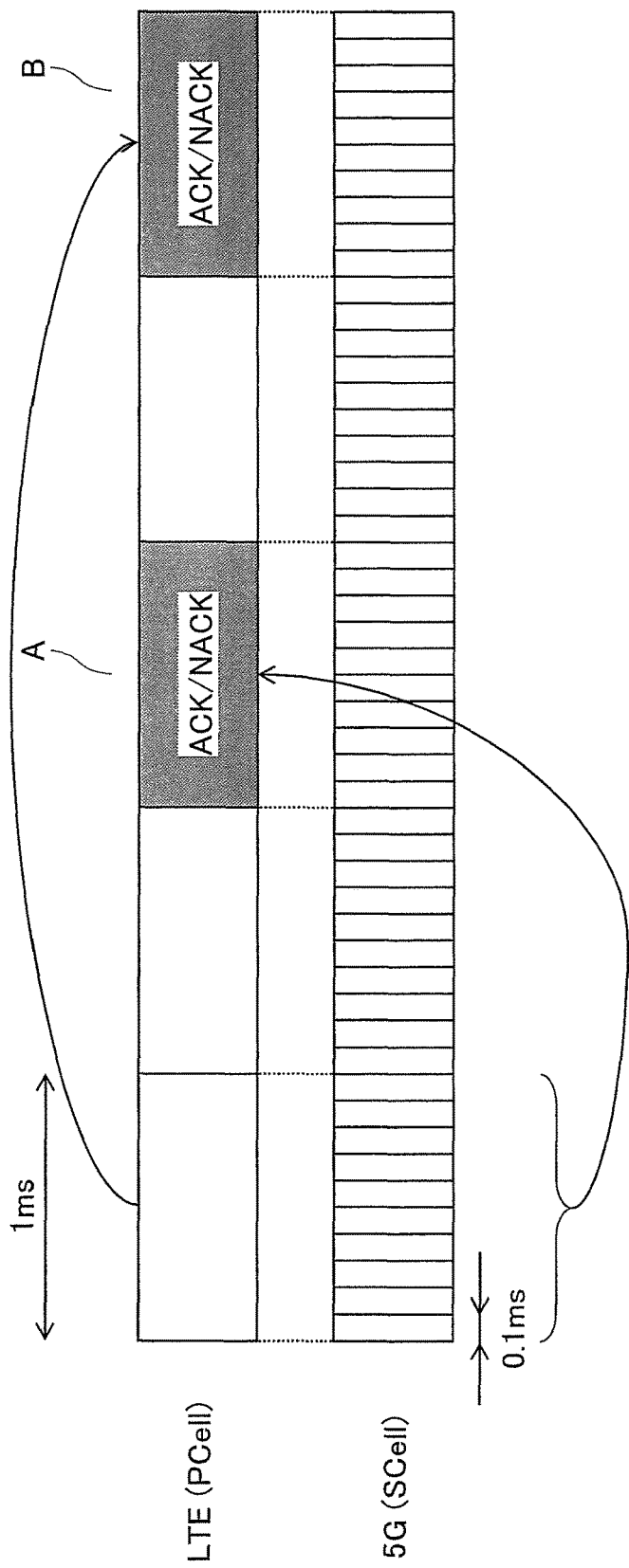
FIG. 14 is a diagram showing an example of ACK/NACK transmission in the modified example.

FIG. 14 is a diagram showing an example of ACK/NACK transmission in the modified example. In the example of FIG. 14, in the HARQ RTT of each cell notified from the base station eNB to the user apparatus UE, an HARQ RTT of the SCell(5G) is shorter than an HARQ RTT of the PCell (LTE). In the example of FIG. 14, an ACK/NACK for DL data received in the SCell is transmitted in an LTE subframe 2 ms after an LTE subframe including the received 5G subframe. On the other hand, an ACK/NACK for DL data received in the PCell is transmitted in an LTE subframe 4 ms after the received LTE subframe.

Apparatus Configuration Example

Next, main configurations of the user apparatus UE and the base station eNB that are able to execute all processes described so far are described. Each of the user apparatus UE and the base station eNB may include all of a function for executing processes described in the first embodiment, a function for executing processes described in the second embodiment and a function for executing processes described in the modified example, or may include any one function or any plurality of functions.

Figure 15:
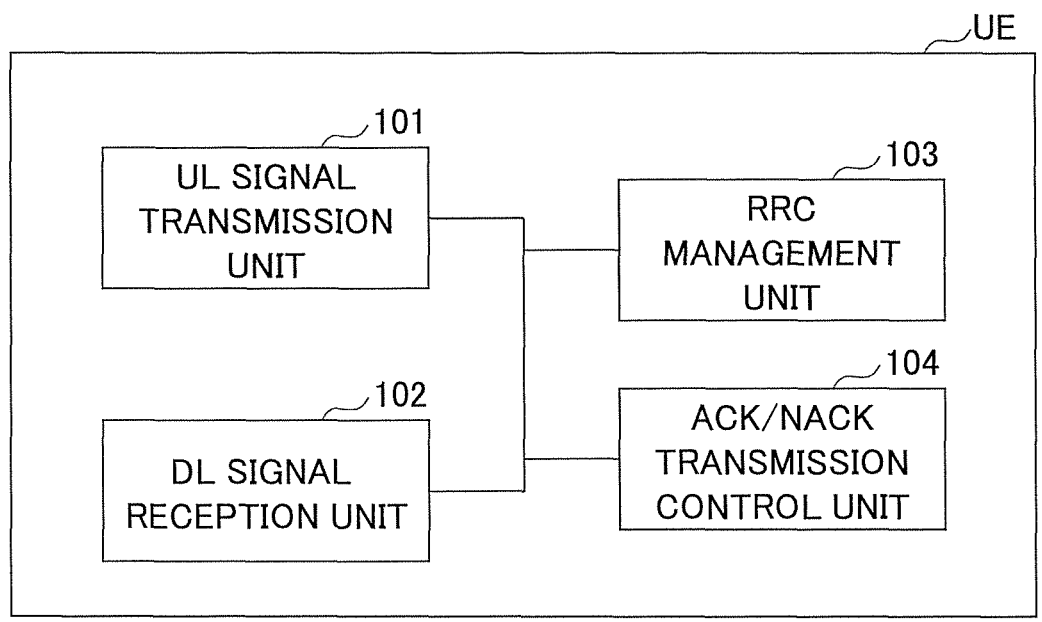
FIG. 15 is a block diagram of a user apparatus UE.

FIG. 15 shows a functional block diagram of the user apparatus UE in the present embodiment. As shown in FIG. 15, the user apparatus UE includes an UL signal transmission unit 101, a DL signal reception unit 102, an RRC management unit 103, and an ACK/NACK transmission control unit 104. FIG. 15 only shows functional units especially related to the embodiment of the present invention in the user apparatus UE, and the user apparatus UE also includes at least functions, not shown in the figure, for performing operation complying with LTE. Also, the configuration shown in FIG. 15 is merely an example, and, any functional segmentations and any names of functional units can be used as long as the user apparatus UE can execute processing described in the present embodiment.

The UL signal transmission unit 101 includes functions configured to generate various signals of physical layer from an upper layer signal to be transmitted from the user apparatus UE, and transmit the signals by radio. The DL signal reception unit 102 includes functions configured to receive various signals from a base station eNB by radio and obtain a signal of an upper layer from the received physical layer signals. Each of the UL signal transmission unit 101 and the DL signal reception unit 102 includes a function for executing CA for performing communication by aggregating a plurality of CCs. Also, the plurality of CCs may include CCs of different RATs like LTE and 5G. As an example, it is possible that the user apparatus UE performs CA in which LTE is used for the PCell and 5G is used for the SCell, as shown in FIG. 2 and the like.

In the present embodiment, also in 5G, basically like LTE, processing such as layer 1 (PHY), layer 2 (MAC, RLC, PDCP) and layer 3 (RRC) and the like is performed. Each of the UL signal transmission unit 101 and the DL signal reception unit 102 includes a packet buffer and performs processing of layer 1 (PHY), and layer 2 (MAC, RLC, PDCP). But, it is not limited to this.

The RRC management unit 103 includes functions for performing processes of setting/changing/management of CA information, configuration change and the like in addition to performing transmission and reception of an RRC signal with the base station eNB. Also, the RRC management unit 103 may include a function of setting/management of bundling time sections in the first embodiment, a function for setting and managing the PUCCH format, and association information and the like between ACK/NACK resources of CCs and 5G subframe numbers in the second embodiment, and a function for setting and managing the value of HARQ RTT of each cell in the modified example. Also, the RRC management unit 103 may include a function for transmitting capability information of HARQ RTT to the base station eNB via the UL signal transmission unit 101. By the way, these functions may be provided in a functional unit in the user apparatus UE other than the RRC management unit 103.

The ACK/NACK transmission control unit 104 performs control of ACK/NACK transmission in the first embodiment, the second embodiment and the modified example. For example, in the case of the first embodiment, the ACK/NACK transmission control unit 104 bundles ACK/NACKs of each piece of DL data generated by the DL signal reception unit 102 according to the setting information of bundling reported from the base station eNB to instruct the UL signal transmission unit 101 to transmit the bundled ACK/NACK by the PUCCH of the PCell.

In the case of the second embodiment, the ACK/NACK transmission control unit 104 instructs the UL signal transmission unit 101 to transmit ACK/NACKs of each piece of DL data generated by the DL signal reception unit 102 by using an ACK/NACK resource according to setting information of association notified from the base station eNB. Also, in the modified example, the ACK/NACK transmission control unit 104 instructs the UL signal transmission unit 101 to transmit ACK/NACKs at a timing according to the HARQ RTT notified from the base station eNB. The ACK/NACK transmission control unit 104 may be included in the UL signal transmission unit 101.

The configuration of the user apparatus UE shown in FIG. 15 may be realized by hardware circuits (example: one or a plurality of IC chips) as a whole, or may be realized by hardware circuits for a part and by a CPU and a program for other parts.

Figure 16:
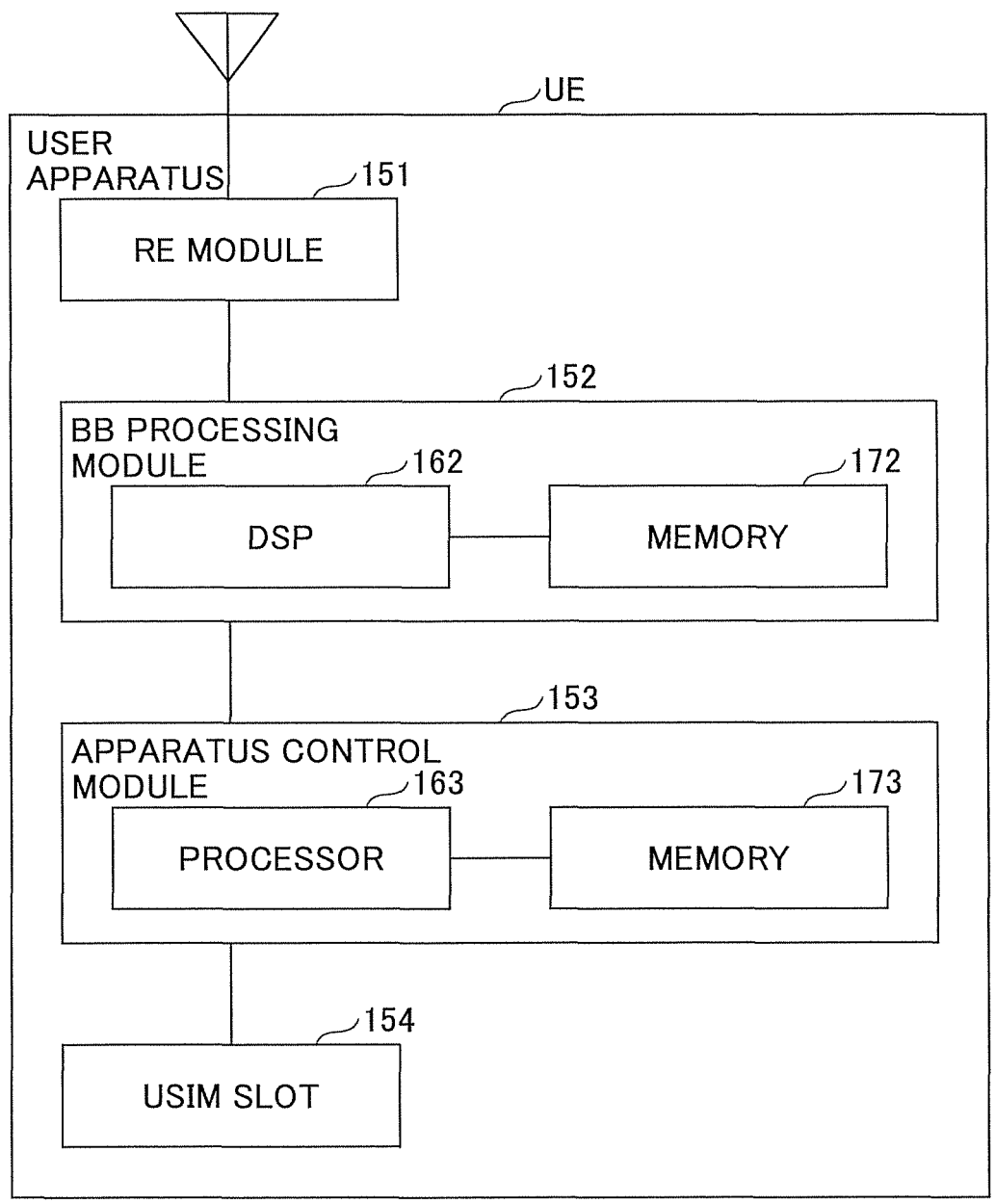
FIG. 16 is a HW block diagram of the user apparatus UE.

FIG. 16 is a diagram showing an example of a hardware (HW) configuration of the user apparatus UE. FIG. 16 shows a configuration closer to an implementation example than that of FIG. 15. As shown in FIG. 16, the UE includes an RE (Radio Equipment) module 151 for performing processing on radio signals, a BB (Base Band) processing module 152 for performing baseband signal processing, an apparatus control module 153 for performing processes of upper layer and the like, and a USIM slot 154 that is an interface for accessing a USIM card.

The RE module 151 generates a radio signal that should be transmitted from an antenna by performing D/A (Digital-to-Analog) conversion, modulation, frequency conversion, and power amplifying and the like on a digital baseband signal received from the BB processing module 152. Also, the RE module 151 generates a digital baseband signal by performing frequency conversion, A/D (Analog to Digital) conversion, demodulation and the like on a received radio signal, to pass the signal to the BB processing module 152. The RE module 151 includes, for example, functions of physical layer and the like of the UL signal transmission unit 101 and the DL signal reception unit 102 of FIG. 15.

The BB processing module 152 performs processing for converting between IP packets and digital baseband signals. The DSP (Digital Signal Processor) 162 is a processor for performing signal processing in the BB processing module 152. The memory 172 is used as a work area of the DSP 162. The BB processing module 152 may include, for example, functions of layer 2 and the like of the UL signal transmission unit 101 and the DL signal reception unit 102, and, include the RRC processing unit 103 and the ACK/NACK transmission control unit 104 of FIG. 15. By the way, all of or a part of functions of the RRC processing unit 103 and the ACK/NACK transmission control unit 104 may be included in the apparatus control module 153.

The apparatus control module 153 performs protocol processing of IP layer, processing of various applications, and the like. The processor 163 is a processor for performing processes performed by the apparatus control module 153. The memory 173 is used as a work area of the processor 163. The processor 163 performs read and write of data with a USIM via the USIM slot 154.

Figure 17:
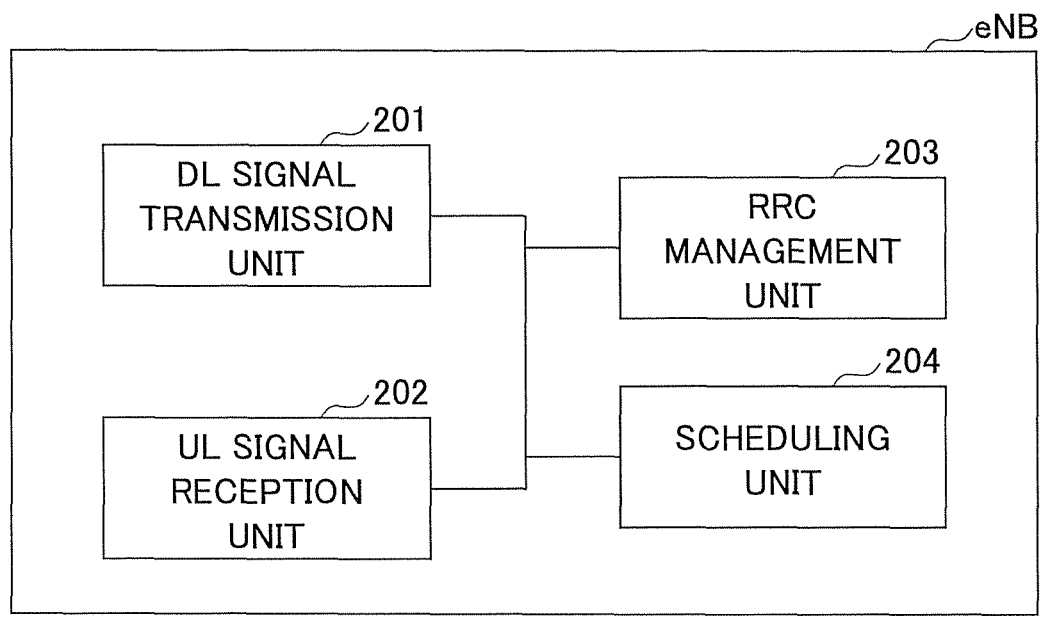
FIG. 17 is a block diagram of a base station eNB.

FIG. 17 shows a functional block diagram of the base station eNB in the present embodiment. As shown in FIG. 17, the base station eNB includes a DL signal transmission unit 201, an UL signal reception unit 202, an RRC management unit 203 and a scheduling unit 204. FIG. 17 only shows functional units especially related to the embodiment of the present invention in the base station eNB, and the base station eNB also includes at least functions, not shown in the figure, for performing operation complying with LTE. Also, the configuration shown in FIG. 17 is merely an example, and, any functional segmentations and any names of functional units can be used as long as the base station eNB can execute processing described in the present embodiment.

The DL signal transmission unit 201 includes functions configured to generate various signals of physical layer from an upper layer signal to be transmitted from the base station eNB, and transmit the signals by radio. The UL signal reception unit 202 includes functions configured to receive various signals from each UE by radio and obtain a signal of an upper layer from the received physical layer signals. Each of the DL signal transmission unit 201 and the UL signal reception unit 202 includes a function for executing CA for performing communication by aggregating a plurality of CCs. Also, the plurality of CCs may include CCs of different RATs like LTE and 5G. As an example, it is possible that the base station eNB performs CA in which LTE is used for the PCell and 5G is used for the SCell, as shown in FIG. 2 and the like. Also, the DL signal transmission unit 201 and the UL signal reception unit 202 may be a radio communication unit, like an RRE, that is placed remotely from the body (control unit) of the base station eNB.

It is assumed that each of the DL signal transmission unit 201 and the UL signal reception unit 202 includes a packet buffer and performs processing of layer 1 (PHY), and layer 2 (MAC, RLC, PDCP) (But, it is not limited to this).

The RRC management unit 203 includes functions for performing processes of setting/changing/management of CA, configuration change and the like in addition to performing transmission and reception of an RRC message with the user apparatus UE. Since the RRC management unit 203 is a functional unit for performing setting of CA, it may be called a setting unit. Also, the RRC management unit 203 may include a function of designation/management of bundling time sections in the first embodiment, a function for designating and managing the PUCCH format, and association information and the like between ACK/NACK resources of CCs and 5G subframe numbers in the second embodiment, and a function for designating and managing the value of HARQ RTT of each cell in the modified example. By the way, these functions may be provided in a functional unit other than the RRC management unit 203 in the base station eNB.

The scheduling unit 204 includes functions for performing scheduling for each cell for the user apparatus UE that performs CA, and generating assignment information of PDCCH to instruct the DL signal transmission unit 201 to transmit the PDCCH including the assignment information. Also, the scheduling unit 204 may include a function for determining whether to perform scheduling of next data or to perform scheduling of retransmission data based on an ACK/NACK returned from the user apparatus UE.

The configuration of the base station eNB shown in FIG. 17 may be realized by hardware circuits (example: one or a plurality of IC chips) as a whole, or may be realized by hardware circuits for a part and by a CPU and a program for other parts.

Figure 18:
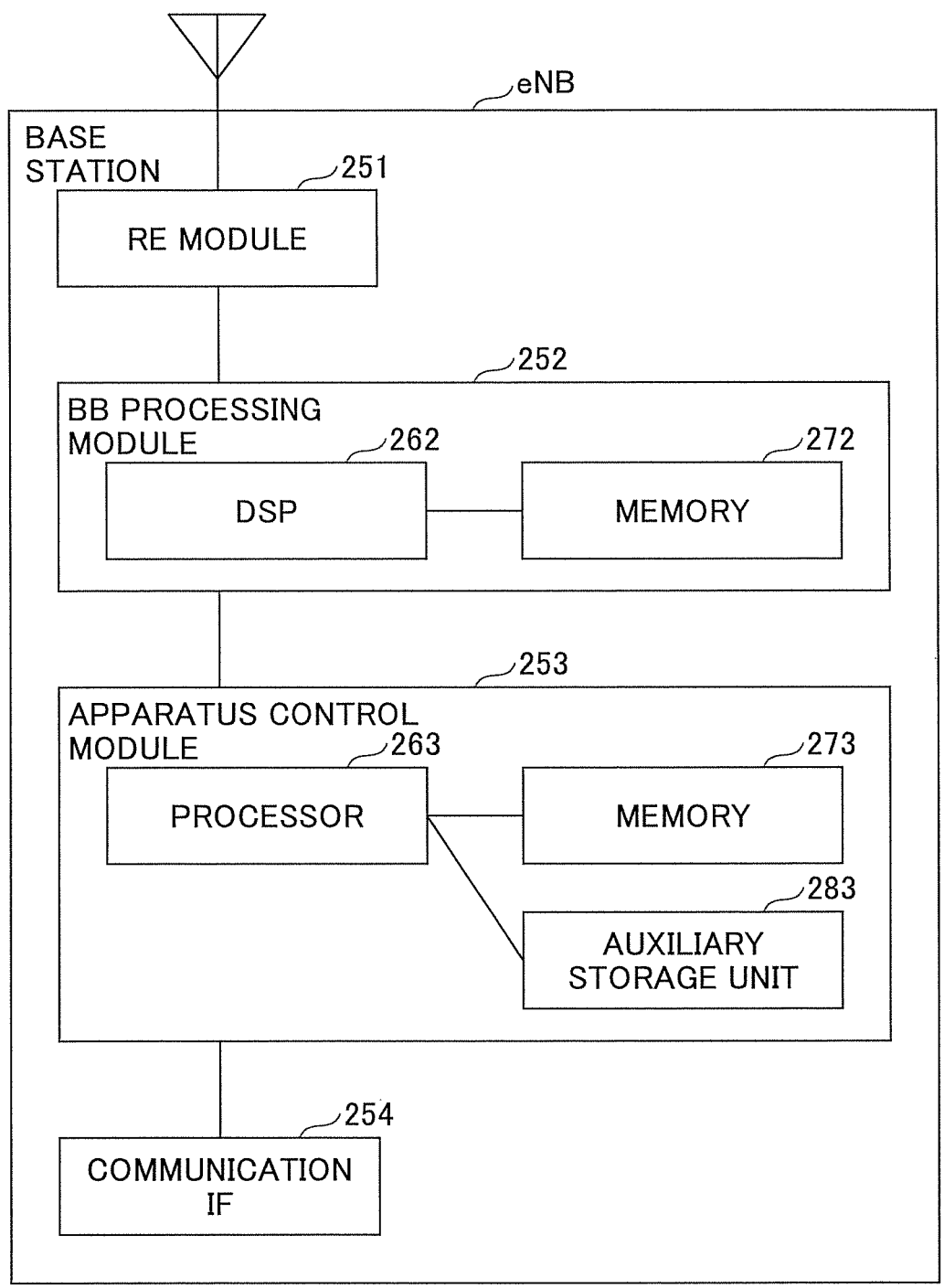
FIG. 18 is a HW block diagram of the base station eNB.

FIG. 18 is a diagram showing an example of a hardware (HW) configuration of the base station eNB. FIG. 18 shows a configuration closer to an implementation example than that of FIG. 17. As shown in FIG. 18, the base station eNB includes an RE module 251 for performing processing on radio signals, a BB processing module 252 for performing baseband signal processing, an apparatus control module 253 for perming processes of upper layer and the like, and a communication IF 254 that is an interface for connecting to a network.

The RE module 251 generates a radio signal that should be transmitted from an antenna by performing D/A conversion, modulation, frequency conversion, and power amplifying and the like on a digital baseband signal received from the BB processing module 252. Also, the RE module 251 generates a digital baseband signal by performing frequency conversion, A/D conversion, demodulation and the like on a received radio signal, to pass the signal to the BB processing module 252. The RE module 251 includes, for example, functions of physical layer and the like of the DL signal transmission unit 201 and the UL signal reception unit 202 of FIG. 17.

The BB processing module 252 performs processing for converting between IP packets and digital baseband signals. The DSP 262 is a processor for performing signal processing in the BB processing module 252. The memory 272 is used as a work area of the DSP 252. The BB processing module 252 may include, for example, functions of layer 2 and the like of the DL signal transmission unit 201 and the UL signal reception unit 202 of FIG. 17, and, include the RRC processing unit 203 and the scheduling unit 204. By the way, all of or a part of functions of the RRC processing unit 203 and the scheduling unit 204 may be included in the apparatus control module 253.

The apparatus control module 253 performs protocol processing of IP layer, OAM processing, and the like. The processor 263 is a processor for performing processes performed by the apparatus control module 253. The memory 273 is used as a work area of the processor 263. The auxiliary storage device 283 is, for example, an HDD and the like, and stores various setting information and the like for operation of the base station eNB itself.

As described above, according to an embodiment of the present invention, there is provided a user apparatus configured to communicate with a base station in a mobile communication system that supports carrier aggregation formed by a plurality of cells including a first cell and a second cell that uses a TTI length different from a TTI length of the first cell, including:

a reception unit configured to receive downlink data transmitted from the base station in the second cell, and generate transmittal acknowledgement information for the downlink data; and a transmission unit configured to bundle a plurality of pieces of transmittal acknowledgement information, generated in the reception unit, for a plurality of pieces of downlink data into one piece of transmittal acknowledgement information to transmit the bundled transmittal acknowledgement information to the base station in the first cell.

According to the above configuration, it becomes possible, in a mobile communication system supporting carrier aggregation formed by a plurality of cells of different TTI lengths, that a user apparatus that performs the carrier aggregation properly transmits transmittal acknowledgement information for downlink data to a base station.

The reception unit may be configured to receive, from the base station, information indicating a group of subframes each having a TTI length in the second cell as information indicating a bundle group for which bundling is performed, and the transmission unit may be configured to perform the bundling for each bundle group. According to this configuration, the user apparatus UE can perform bundling for a group in accordance with an instruction from a base station, so that high speed processing becomes possible.

Also, according to an embodiment of the present invention, there is provided a user apparatus configured to communicate with a base station in a mobile communication system that supports carrier aggregation formed by a plurality of cells including a first cell and a second cell that uses a TTI length different from a TTI length of the first cell, including:

a reception unit configured to receive downlink data transmitted from the base station in the second cell and generate transmittal acknowledgement information for the downlink data; and a transmission unit configured to transmit the transmittal acknowledgement information generated in the reception unit to the base station in the first cell by using a resource in an uplink control channel in which resources for transmitting transmittal acknowledgement information for downlink data of a plurality of cells that form the carrier aggregation are predetermined.

According to the above-configuration, it becomes possible, in a mobile communication system supporting carrier aggregation formed by a plurality of cells of different TTI lengths, that a user apparatus that performs the carrier aggregation properly transmits transmittal acknowledgement information for downlink data to a base station.

The reception unit may be configured to receive, from the base station, association information that associates a resource for transmitting transmittal acknowledgement information of a cell in the uplink control channel with a resource for transmitting transmittal acknowledgement information for downlink data received in the second cell, and wherein the transmission unit may be configured to determine a resource for transmitting transmittal acknowledgement information for downlink data received in the second cell according to the association information, and to transmit the transmittal acknowledgement information for the downlink data by using the resource. According to this configuration, for example, the user apparatus can use a proper ACK/NACK resource in an extended or existing PUCCH as a resource for transmitting transmittal acknowledgement information for downlink data received in the second cell.

The reception unit may be configured to receive, from the base station, time information on a time from when receiving the downlink data until when transmitting transmittal acknowledgement information of the downlink data, and wherein the transmission unit may be configured to transmit the transmittal acknowledgement information of the downlink data, to the base station, after the time based on the time information elapses after receiving the downlink data. According to this configuration, for example, RTT in the second cell can be shortened, so that delay can be reduced.

The transmission unit may be configured to transmit, to the base station, capability information on a time from when receiving the downlink data until when transmitting transmittal acknowledgment information of the downlink data. According to this configuration, the base station can properly determine the time information.

The TTI length of the second cell may be shorter than the TTI length of the first cell. According to this configuration, for example, in a case where a 5G cell is used as the second cell and an LTE cell is used as the first cell, it is possible to properly transmit transmittal acknowledgement information to a base station.

The user apparatus UE described in an embodiment of the present invention may include a CPU and a memory and may be realized by executing a program by the CPU (processor), or may be realized by hardware such as hardware circuits including logics of processing described in the present embodiment, or may be configured by coexistence of a program and hardware.

The base station eNB described in an embodiment of the present invention may include a CPU and a memory and may be realized by executing a program by the CPU (processor), or may be realized by hardware such as hardware circuits including logics of processing described in the present embodiment, or may be configured by coexistence of a program and hardware.

In the above, the embodiment of the present invention has been explained. However, the disclosed invention is not limited to the embodiment. Those skilled in the art will conceive of various modified examples, corrected examples, alternative examples, substituted examples, and the like. While specific numerical value examples are used to facilitate understanding of the present invention, such numerical values are merely examples, and any appropriate value may be used unless specified otherwise. Classification into each item in the description is not essential in the present invention, and features described in two or more items may be combined and used as necessary. Subject matter described in an item may be applied to subject matter described in another item (provided that they do not contradict).

It is not always true that the boundaries of the functional units or the processing units in the functional block diagram correspond to boundaries of physical components. The operations by the plural functional units may be physically performed by a single component. Alternatively, the operations by the single functional unit may be physically performed by plural components.

For convenience of explanation, the user apparatus UE and the base station eNB have been explained by using functional block diagrams. However, such apparatuses may be implemented in hardware, software, or a combination thereof.

The software that operates by a processor provided in the user apparatus according to an embodiment of the present invention, and the software that operates by a processor provided in the base station may be stored in any proper storage medium such as a Random Access Memory (RAM), a flash memory, a Read Only Memory (ROM), an EPROM, an EEPROM, a register, a hard disk (HDD), a removable disk, a CD-ROM, a database, a server and the like.

The present invention is not limited to the above-mentioned embodiment and is intended to include various variations, modifications, alterations, substitutions and so on without departing from the spirit of the present invention.

The present patent application claims priority based on Japanese patent application No. 2015-032340, filed in the JPO on Feb. 20, 2015, and the entire contents of the Japanese patent application No. 2015-032340 are incorporated herein by reference.

DESCRIPTION OF REFERENCE SIGNS

UE user apparatus
eNB base station
101 UL signal transmission unit
102 DL signal reception unit
103 RRC management unit
104 ACK/NACK transmission control unit
151 RE module
152 BB processing module
153 apparatus control module
154 USIM slot
201 DL signal transmission unit
202 UL signal reception unit
203 RRC management unit
204 scheduling unit
251 RE module
252 BB processing module
253 apparatus control module
254 communication IF

The invention claimed is:

1. A transmittal acknowledgement information transmission method executed by a user apparatus configured to communicate with a base station in a mobile communication system that supports carrier aggregation formed by a plurality of cells including a first cell and a second cell that uses a unit time length different from a unit time length of the first cell, comprising:
   receiving downlink data transmitted from the base station in the second cell and generating transmittal acknowledgement information for the downlink data;
   receiving, from the base station, time information on a time from when receiving the downlink data until when transmitting transmittal acknowledgement information of the downlink data; and
   transmitting the generated transmittal acknowledgement information to the base station in the first cell using a resource in an uplink control channel in which resources for transmitting transmittal acknowledgement information for downlink data of a plurality of cells that form the carrier aggregation are predetermined, after the time based on the time information elapses after receiving the downlink data.

2. A user apparatus configured to communicate with a base station in a mobile communication system that supports carrier aggregation formed by a plurality of cells including a first cell and a second cell that uses a unit time length different from a unit time length of the first cell, comprising:
   a reception unit configured to receive downlink data transmitted from the base station in the second cell and generate transmittal acknowledgement information for the downlink data; and
   a transmission unit configured to transmit the transmittal acknowledgement information generated in the reception unit to the base station in the first cell using a resource in an uplink control channel in which resources for transmitting transmittal acknowledgement information for downlink data of a plurality of cells that form the carrier aggregation are predetermined,
   wherein the reception unit is configured to receive, from the base station, time information on a time from when receiving the downlink data until when transmitting transmittal acknowledgement information of the downlink data, and
   wherein the transmission unit is configured to transmit the transmittal acknowledgement information of the downlink data, to the base station, after the time based on the time information elapses after receiving the downlink data.

3. The user apparatus as claimed in claim 2, wherein the reception unit is configured to receive, from the base station, association information that associates a resource for transmitting transmittal acknowledgement information of a cell in the uplink control channel with a resource for transmitting transmittal acknowledgement information for downlink data received in the second cell, and wherein the transmission unit is configured to determine a resource for transmitting transmittal acknowledgement information for downlink data received in the second cell according to the association information, and to transmit the transmittal acknowledgement information for the downlink data by using the resource.

4. The user apparatus as claimed in claim 1, wherein the reception unit is configured to receive, from the base station, time information on a time from when receiving the downlink data until when transmitting transmittal acknowledgement information of the downlink data, and wherein the transmission unit is configured to transmit the transmittal acknowledgement information of the downlink data, to the base station, after the time based on the time information elapses after receiving the downlink data.

5. The user apparatus as claimed in claim 1, wherein the unit time length of the second cell is shorter than the unit time length of the first cell.

6. The user apparatus as claimed in claim 2, wherein the unit time-length of the second cell is shorter than the unit time length of the first cell.

* * * * *